(12) United States Patent
Kovach (10) Patent No.: US 7,290,907 B2
(45) Date of Patent: Nov. 6, 2007

(54) VEHICLE HEADLAMP WITH DAYTIME RUNNING LIGHT

(75) Inventor: Steven Kovach, Dublin, OH (US)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 11/361,555

(22) Filed: Feb. 24, 2006

(65) Prior Publication Data

US 2007/0201240 A1 Aug. 30, 2007

(51) Int. Cl.
*F21V 17/02* (2006.01)

(52) U.S. Cl. .................. 362/512; 362/319; 362/464; 362/277; 362/282; 362/283

(58) Field of Classification Search ........ 362/512–513, 362/277–279, 282–284, 465–469, 538–539, 362/281
See application file for complete search history.

(56) References Cited

U.S. PATENT DOCUMENTS

| | | | |
|---|---|---|---|
| 2,208,079 A * | 7/1940 | Nosal | 362/280 |
| 4,574,334 A * | 3/1986 | Igura | 362/515 |
| 4,663,696 A | 5/1987 | Miyazawa et al. | |
| 4,760,499 A * | 7/1988 | Il | 362/512 |
| 4,857,794 A * | 8/1989 | Watanabe | 313/113 |
| 4,908,560 A | 3/1990 | Shibata et al. | |
| 4,967,319 A | 10/1990 | Seko | |
| 4,987,521 A * | 1/1991 | Fratty et al. | 362/512 |
| 5,023,758 A | 6/1991 | Allen et al. | |
| 5,060,120 A | 10/1991 | Kobayashi et al. | |
| 5,180,218 A | 1/1993 | Ohshio | |
| RE34,253 E | 5/1993 | Fratty et al. | |
| 5,213,406 A | 5/1993 | Neumann et al. | |
| 5,264,993 A | 11/1993 | Neumann et al. | |
| 5,673,990 A * | 10/1997 | Neumann et al. | 362/513 |
| 5,709,451 A | 1/1998 | Flora et al. | |
| 5,718,505 A | 2/1998 | Daumueller et al. | |
| 5,769,525 A | 6/1998 | Daumueller et al. | |
| 5,899,559 A | 5/1999 | Lachmayer et al. | |
| 6,007,221 A | 12/1999 | Taniuchi et al. | |
| 6,043,614 A | 3/2000 | Tessnow et al. | |
| 6,059,435 A | 5/2000 | Hamm et al. | |
| 6,179,455 B1 | 1/2001 | Taniuchi | |
| 6,186,651 B1 | 2/2001 | Sayers et al. | |
| 6,190,029 B1 | 2/2001 | Taniuchi et al. | |
| 6,280,067 B1 | 8/2001 | Albou | |
| 6,281,632 B1 | 8/2001 | Stam et al. | |
| 6,388,380 B1 | 5/2002 | Minami et al. | |
| 6,447,151 B1 * | 9/2002 | Jones | 362/465 |
| 6,447,153 B1 | 9/2002 | Kawamura | |
| 6,457,849 B2 | 10/2002 | Tsukamoto | |
| 6,474,854 B2 | 11/2002 | Ohshio | |
| 6,478,459 B1 | 11/2002 | Ui | |

(Continued)

*Primary Examiner*—Robert May
(74) *Attorney, Agent, or Firm*—Christen Millard; Michael A. Forhan; Eley Law Firm Co.

(57) ABSTRACT

A vehicle headlamp. The headlamp comprises a light source and a reflector to direct light received from the light source out of the headlamp. A movable shade is positionable to control the light received by the reflector. A shade driver is coupled to the movable shade to position the shade. A first shade position configures the headlamp for high beam lighting. A second shade position configures the headlamp for low beam lighting. A third shade position configures the headlamp for daytime running lights.

6 Claims, 7 Drawing Sheets

U.S. PATENT DOCUMENTS

| | | |
|---|---|---|
| 6,478,460 B2 | 11/2002 | Furuya et al. |
| 6,497,503 B1 | 12/2002 | Dassanayake et al. |
| 6,508,575 B2 | 1/2003 | Okubo et al. |
| 6,533,443 B2 | 3/2003 | Kawamura et al. |
| 6,554,460 B1 | 4/2003 | Saladin |
| 6,565,245 B2 | 5/2003 | Yokoi |
| 6,565,246 B2 | 5/2003 | Suzuki et al. |
| 6,578,995 B2 | 6/2003 | Suzuki |
| 6,585,401 B2 | 7/2003 | Akizuki et al. |
| 6,593,698 B2 | 7/2003 | Stam et al. |
| 6,709,140 B2 | 3/2004 | Ui |
| 6,776,513 B2 | 8/2004 | Albou |
| 6,796,692 B2 | 9/2004 | Nakada et al. |
| 6,799,874 B2 | 10/2004 | Nakata |
| 6,942,369 B2 * | 9/2005 | Le Bars et al. .............. 362/464 |
| 7,044,624 B2 * | 5/2006 | Taniuchi ..................... 362/539 |
| 7,052,165 B2 * | 5/2006 | Field ......................... 362/524 |
| 2002/0075693 A1 * | 6/2002 | Rosenhahn et al. ......... 362/513 |
| 2003/0128550 A1 | 7/2003 | Ui |
| 2003/0235056 A1 | 12/2003 | Jong |
| 2004/0136200 A1 | 7/2004 | Bos et al. |

* cited by examiner

VEHICLE HEADLAMP WITH DAYTIME RUNNING LIGHT

FIELD

The present invention relates to vehicle headlamps, in particular a vehicle headlamp capable of varying the light distribution of a reflector assembly by adjusting the position of a movable shade in relation to a lamp.

BACKGROUND

Vehicles commonly have headlamps that provide low and high beam lighting for driving at night. High beam lighting provides a substantial amount of light aimed so as to enable the driver to see greater distances on dark roads, while low beam lighting provides a lesser amount of light aimed closer to the vehicle for driving on lighted streets or to prevent dazzling drivers of oncoming vehicles. Separate incandescent and/or halogen lamps may be utilized for low and high beam headlamps. Alternatively, a single lamp may have a plurality of selectable filaments for high and low beam operation, or a high beam lamp may be dimmed for low beam operation.

Vehicle designers are increasingly turning to high intensity discharge ("HID") lamps for use in headlamp systems due to their high efficiency in comparison to incandescent and halogen lamps. A typical characteristic of HID lamps is that they must be operated at a generally fixed power level for proper operation. This inflexibility makes dimming of an HID high beam headlamp for low beam operation impractical. To avoid the complexity and expense of utilizing two HID systems to cover both high beam and low beam operation, vehicle designers have incorporated into headlamp assemblies various types of movable shades proximate a single HID lamp. The shades are typically moved to predetermined positions proximate the lamp for low beam operation, partially shielding and/or redirecting light emitted from the lamp. Accordingly, only a portion of the total amount of light emitted by the lamp reaches a reflector to be directed out of the headlamp. When high beam operation is desired, the shade is moved away from the HID lamp, allowing a greater portion of the light emitted by the lamp to reach the reflector and be directed out of the headlamp.

As a safety enhancement many vehicles now include daytime running lights ("DRL") in addition to low and high beam headlamps. As the term implies, DRL are normally operated in substantially daylight conditions. A vehicle equipped with DRL is more likely to be noticed by other drivers, thereby reducing the probability of a collision with the vehicle.

Daytime running lights that use incandescent or halogen lamps as a light source are typically formed from the vehicle's low or high beam headlamps. For DRL operation with high beam headlamps, the headlamps are operated at a reduced intensity. Alternatively, low beam headlamps may be operated at either full or reduced power for DRL operation. Such systems are designed to automatically function as DRL when the vehicle is started and to be overridden when regular high or low beam headlamps are activated.

DRL presents a challenge for HID-based vehicle lighting systems, since HID lamps must be operated at a relatively fixed power level and are not easily dimmed, as discussed above. This limitation often drives the use of a separate DRL unit, adding cost and complexity to the vehicle. Thus, there is a need for a way to avoid the expense and complexity of a separate DRL system for vehicles having headlamps that use HID lamps as a light source.

SUMMARY

The present invention utilizes a movable shade that can be positioned at predetermined locations in relation to an HID lamp to control the lighting pattern and intensity of an HID headlamp for low beam and high beam operation. In addition, the movable shade can be positioned at a third predetermined location such that light emitted by the HID lamp meets vehicle requirements for DRL operation. Thus, the HID lamp can be operated a fixed power level while the light output of the headlamp can be electro-mechanically controlled to meet illumination needs for the vehicle for low beam, high beam and DRL operational modes.

An aspect of the present invention is a vehicle headlamp. The headlamp comprises a light source and a reflector to direct light received from the light source out of the headlamp. A movable shade is positionable to control the light received by the reflector. A shade driver is coupled to the movable shade to position the shade. A first shade position configures the headlamp for high beam lighting. A second shade position configures the headlamp for low beam lighting. A third shade position configures the headlamp for daytime running lights.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like reference numerals are used to indicate like elements and structures in the various figures.

Figure 1:
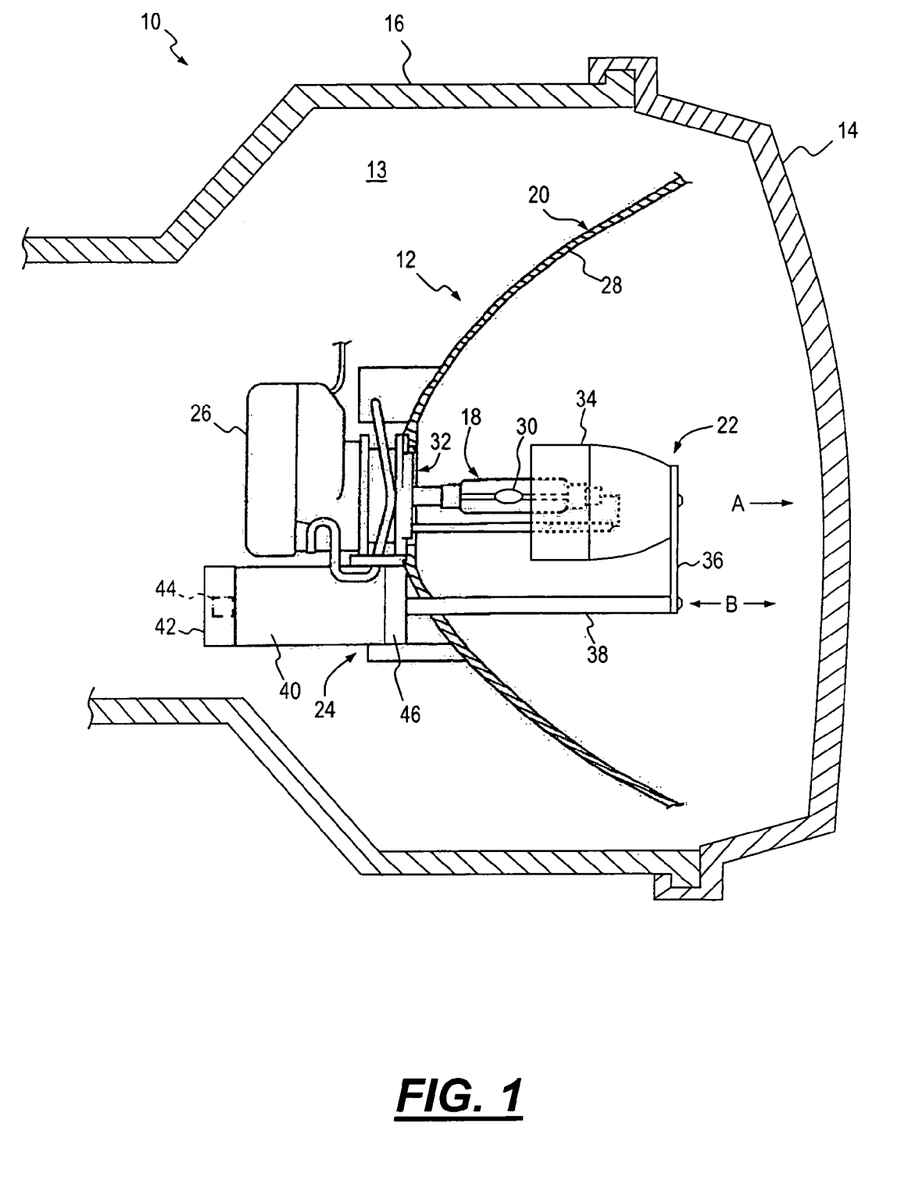
FIG. 1 is a sectional side elevation of a vehicle headlamp according to an embodiment of the present invention.

FIG. 1 is a sectional side elevation of a vehicle headlamp 10 according to an embodiment of the present invention. The headlamp 10 according to this embodiment includes a reflector assembly 12 mounted in a lamp chamber 13 that is generally defined by a transparent cover 14 and a housing 16. Reflector assembly 12 includes a discharge lamp 18, a reflector 20, a movable shade 22, a shade driver 24 and a lamp support base 26.

Cover 14 is generally transparent and serves to protect reflector assembly 12 from exposure to the elements. Cover 14 is a conventional cover made from any suitable conventional materials, such as glass and plastic. In some embodiments cover 14 may also include various grooves, fillets, contours and shapes optically designed to at least partially shape the distribution of light emitted from headlamp 10.

Light distribution of headlamp 10 is primarily controlled by reflector assembly 12. Reflector 20 has a reflecting surface 28 for directing light received from discharge lamp 18 in a generally forward direction "A" so that a beam is formed and emitted with a prescribed light distribution pattern that is shaped by diffusing and/or deflecting the light incident on the reflecting surface. Reflector 20 may be any conventional type of optical reflector, such as an elliptical or parabolic reflector.

Lamp 18 provides a light source for headlamp 10. Lamp 18 may be any conventional type of discharge lamp including, as a non-limiting example, a high pressure metal vapor discharge lamp such as a metal halide HID lamp.

Lamp 18 is fixedly supported in relation to reflector 20 by lamp support base 26 so that a light-emitting portion 30 of the lamp is positioned generally at an optical focal point of reflector 20. Lamp support base 26 may be made of any suitable material, such as metal, plastic and ceramic, and extends through an opening 32 of reflector 20.

Movable shade 22 comprises a shade body 34 and a shade leg 36. Shade body 34 is preferably opaque and generally cylindrical in shape with an open end oriented toward lamp 18 and an opposing, closed end. Shade body 34 may be made from any suitable material, such as metal, plastic, coated glass and ceramics. The material selected for shade body 34 is preferably capable of withstanding heat generated by lamp 18, along with other environmental considerations for headlamp 10. Shade body 34 may optionally have a polished, absorptive or reflective inner and/or outer surface. In various embodiments shade body 34 may be other geometric shapes, such as elliptical, hexagonal, octagonal and rectangular shapes. Cut-outs may also be added to shade body 34 as desired, to further shape the lighting pattern or control the lighting output of headlamp 10.

Shade leg 36 extends between shade body 34 and shade driver 24. Shade leg 36 may extend from the closed end of shade body 34 or from a sidewall of the shade body. Shade leg 36 may be a separate component that is attached to shade body 34, or may be formed as an integral part of the shade body. The shape and dimensions of shade leg 36 are not critical and may vary as needed to accommodate the arrangement of other components of headlight 10.

Shade driver 24 comprises a drive member 38 actuable by an electric motor 40. Motor 40, when powered, causes drive member 38 to move bidirectionally and generally linearly along an axis "B" such that shade body 34 shields more or less of the light emitted by lamp 18 from reaching reflective surface 28. Motor 40 may be any conventional type of motor including, but not limited to, a permanent magnet motor, a brushless DC motor and a stepper motor. Motor 40 may optionally include a dynamic and/or mechanical brake 42 to stop the motor and/or keep its shaft 44 from rotating when the motor is not operating. Motor 40 may further include a gear reduction 46 to provide an output displacement, velocity and torque that is compatible with drive member 38 to move shade 22.

Drive member 38 converts rotary motion from motor 40 to linear motion to move movable shade 22 toward or away from lamp 18 in accordance with the selected position for the shade, as detailed above. Drive member 38 may be any conventional type of rotary-to-linear motion converter including, without limitation, a ball screw, lead screw, belt drive, and a rack-and-pinion. In some embodiments drive member 38 may be a rotary-to-oscillatory converter, such as a four-bar linkage mechanism. In other embodiments motor 40 and drive member 38 may be replaced by a linear motor-actuator. Drive member 38 may further comprise gearing to reduce the speed of rotational motive force provided by motor 40 and/or amplify the amount of motive force delivered by the motor.

Figure 2A:
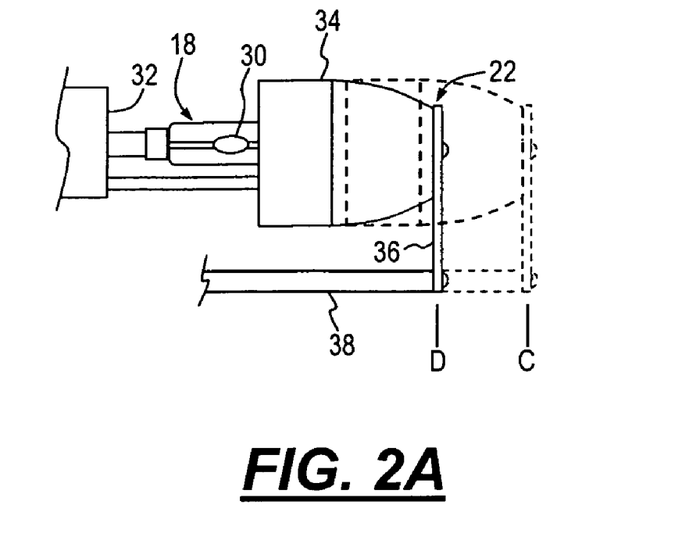
FIG. 2A depicts low and high beam positions of a movable shade in relation to a discharge lamp for a headlamp according to an embodiment of the present invention.

With reference now to FIG. 2A, movable shade 22 can be positioned at a high-beam forming position, shown in outline at position "C," and a low-beam forming position, shown at position "D." Shade body 34 partially shields lamp 18 when it is positioned at the low-beam position "D," thereby reducing the amount of light presented to reflecting surface 28. Shade body 34 does not substantially shield lamp 18 when positioned at the high-beam position "C," thereby allowing a greater amount of the light emitted by the lamp to reach reflecting surface 18.

Figure 2B:
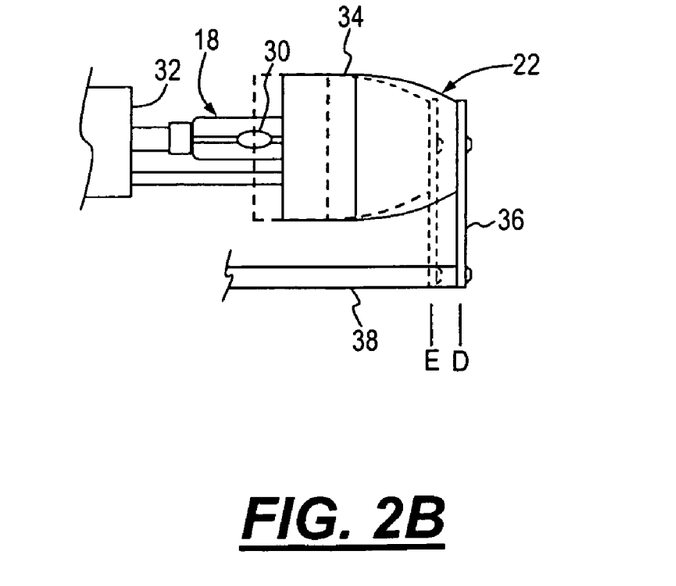
FIG. 2B depicts low beam and DRL positions of the movable shade of FIG. 2A in relation to the discharge lamp.

With reference to FIG. 2B, movable shade 22 can be further moved to a third, DRL position, shown in outline as position "E." At position "E," shade body 34 shields lamp 18 to an even greater degree than at low beam forming position "D," thereby allowing a lesser amount of light sufficient for DRL operation to reach reflecting surface 28.

Figure 3A:
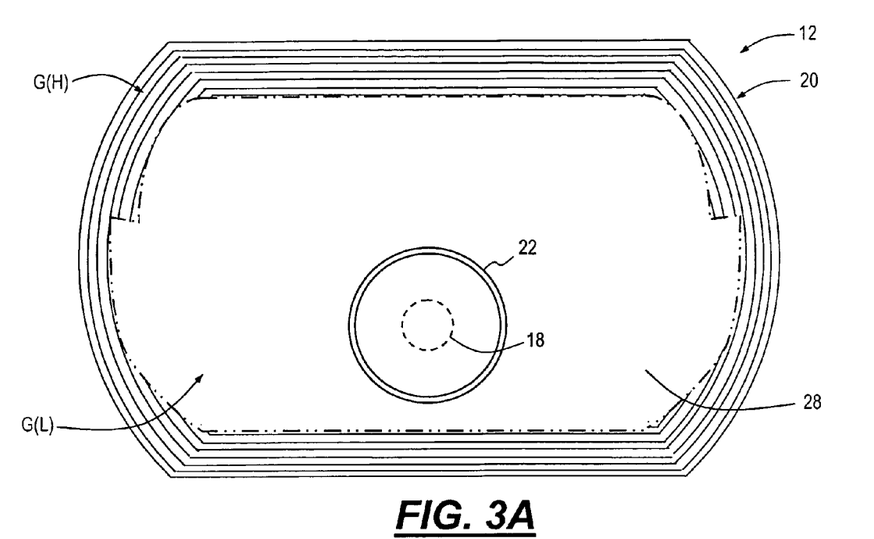
FIG. 3A illustrates example lighting patterns for light incident on a reflecting surface for low and high beams of a headlamp according to an embodiment of the present invention.

The effect of the position of movable shade 22 upon light emitted by vehicle headlamp 10 is observed by additional reference to FIG. 3A. In particular, when at the low beam forming position "D" shown in FIG. 2A, movable shade 22 surroundably shields at least a portion of lamp 18 to obstruct a portion of light emitted from the lamp. Movable shade 22 accordingly prevents the obstructed light from reaching a peripheral region "G(H)" of the reflecting surface 28, allowing the unobstructed portion of the light emitted by lamp 18 to be directly incident only on a central region "G(L)" thereof such that only a predetermined amount of light required to emit a low beam is incident on the reflecting surface 28. Conversely, when at the high-beam forming position "C" of FIG. 2A movable shade 22 allows the light to be incident on substantially the entire region of reflecting surface 28 (i.e., both regions G(H) and G(L) so as to ensure a sufficient amount of light to emit a high beam.

Figure 3B:
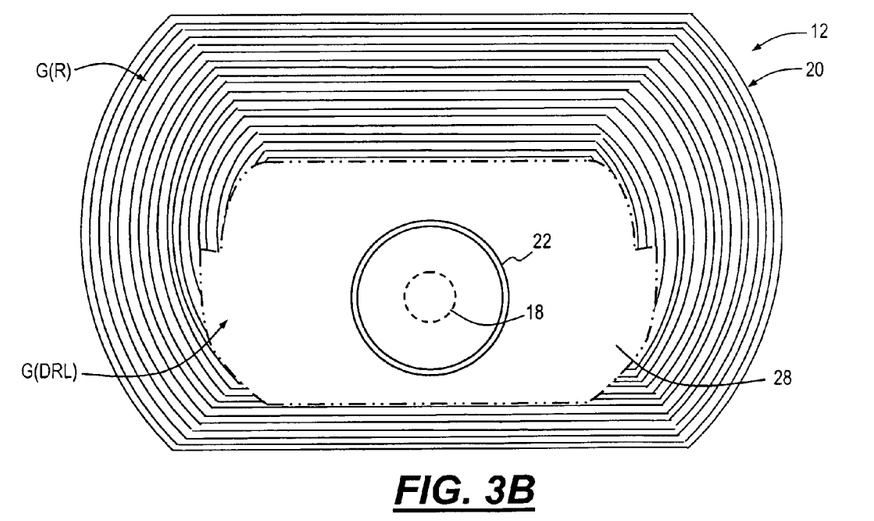
FIG. 3B illustrates example lighting patterns for light incident on a reflecting surface for DRL and high beams of a headlamp according to an embodiment of the present invention.

With reference to FIG. 3B, when at the daytime running light position "E" of FIG. 2B. movable shade 22 surroundably shields at least a portion of lamp 18 to obstruct a portion of the light emitted from the lamp and prevents the obstructed light from reaching the peripheral region G(P) of the reflecting surface 28. The unobstructed portion of the light emitted by lamp 18 is directly incident only on a central region G(DRL) thereof such that only a predetermined amount of light required to emit a daytime running light is incident on reflecting surface 28. "G(L)" thereof such that only a predetermined amount of light required to emit a low beam is incident on the reflecting surface 28. Conversely, when at the high-beam forming position "C" of FIG. 2A movable shade 22 allows the light to be incident on substantially the entire region of reflecting surface 28 (i.e., both regions G(H) and G(L)) so as to ensure a sufficient amount of light to emit a high beam.

Figure 4:
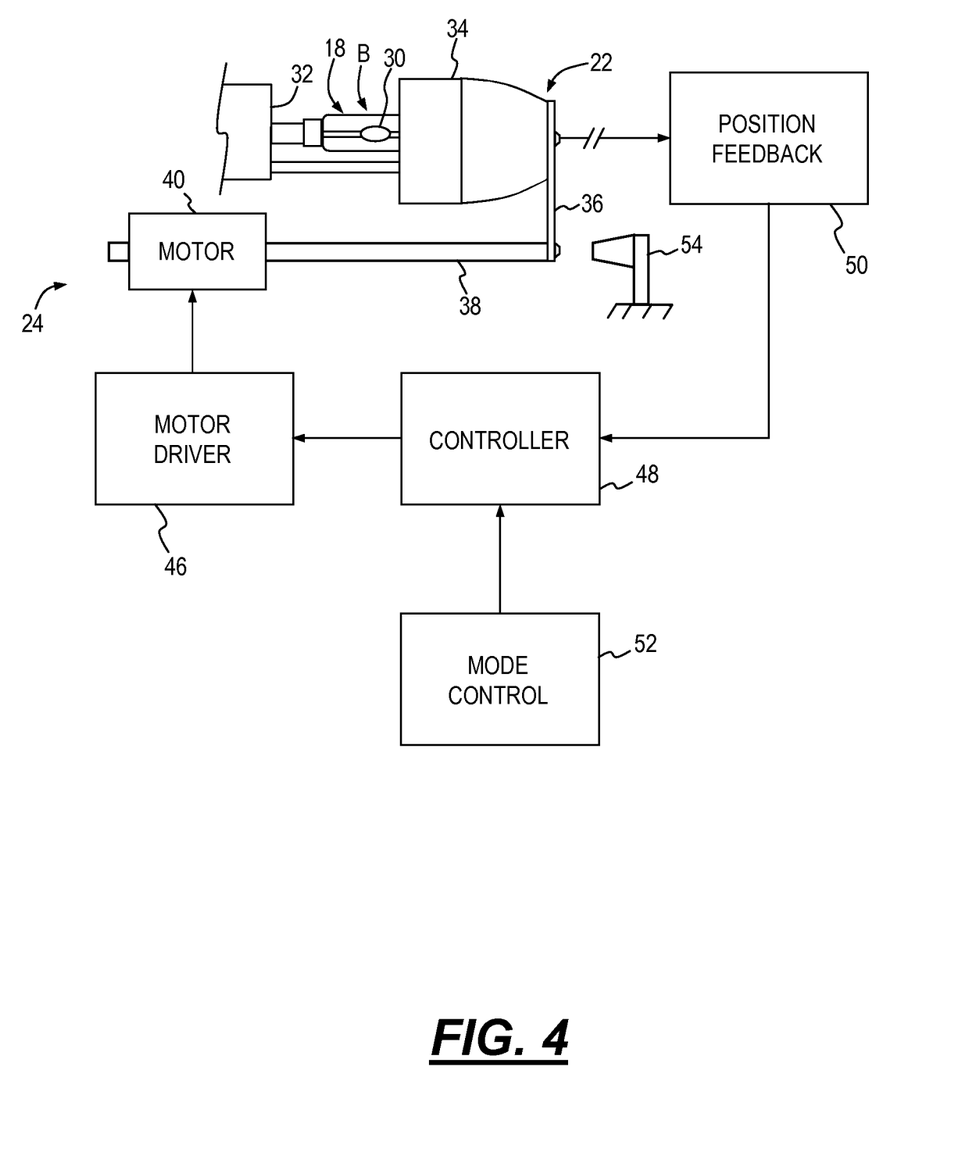
FIG. 4 is a block diagram showing the general arrangement of a system to control the position of a movable shade of a vehicle headlamp, according to an embodiment of the present invention.

With reference now to FIG. 4, in accordance with an embodiment of the present invention movable shade 22 is selectively actuated to the aforementioned low beam, high beam and DRL positions by shade driver 24 in cooperation with a motor driver 46, a controller 48, a position feedback element 50 and a mode control 52.

Motor driver 46 provides electrical power suitable for operating motor 40 and may be tailored to the requirements of the type of motor selected for a particular configuration of the present invention. For example, electromechanical and solid state relays and solid state devices such as bipolar and field effect transistors may be used to selectively supply power to motor 40 for either unidirectional or bidirectional rotation of an output shaft (not shown) of the motor. In addition, motor driver 46 may be configured to provide commutation to motors that require external commutation, such as brushless DC and stepper motors. Motor drivers and commutators for the various types and winding configurations of motors are well-known in the art. Accordingly, construction details of motor driver 46 are left to the artisan.

Controller 48 receives command information corresponding to a predetermined selected position (i.e., positions "C," "D," "E" of FIGS. 2A and 2B) for movable shade 22 from mode control 52 and determines the actual position of the movable shade from information provided by feedback element 50. If the position of movable shade 22 does not match the position commanded by mode control 52, controller 48 actuates motor driver 46 to operate motor 40 in a predetermined manner until feedback element 50 indicates to the controller that the movable shade has moved to the selected position.

Controller 48 may further monitor for various fault conditions and resolve them in a predetermined manner. For example, controller 48 may monitor for a locked motor rotor, over-temperature or short-circuit conditions in motor 40, over-temperature and over-current conditions in motor driver 46, illegal or invalid mode control 52 inputs, and invalid position information from feedback element 50. Example fault resolution responses for controller 48 include, without limitation, selectably removing power from faulty components of headlight 10, rerouting power among components of the headlight, calculating the current and/or commanded position of movable shade 22 from a last-known position, and switching from faulty components to alternate components. Controller 48 may further include fault resolution wherein movable shade 22 is positioned at a predetermined position under certain fault conditions, thus allowing the vehicle to be driven pending resolution of the fault. A secondary position sensing arrangement and/or a mechanical stop 54 (FIG. 4) may optionally be included, thus allowing moveable shade 22 to be positioned at the predetermined position even in the event of a failure of feedback element 50.

Controller 48 may be implemented in any conventional form of analog or digital closed-loop servo controller having operational aspects including, but not limited to, force, velocity and directional controls for motor 40. Controller 48 may further include a predetermined set of logical instructions, such as a computer program, to define the various operational aspects of the controller.

Position feedback element 50 provides information to controller 48 relating to the position of movable shade 22. Feedback element 50 may be any conventional type of feedback element in the art that is compatible with the architecture chosen for controller 48. For example, feedback element 50 may be an absolute or relative position encoder. In other embodiments feedback element 50 may be an arrangement of electromechanical or solid state limit switches or proximity-sensing elements located at predetermined positions relative to movable shade 22. In some embodiments utilizing a stepper or brushless DC motor a limit switch or proximity sensor at a known or calibrated position of movable shade 22 may serve as an index point for a predetermined set of instructions used by controller 48 to count the number of commutation pulses required to reach a predetermined position of the movable shade. In addition to position information, feedback element 50 may provide controller 48 with information relating to the velocity of movable shade 22 when it is moving. The aforementioned encoders, switches and proximity-sensing elements for position feedback are well-known in the art. Accordingly, details of these devices are not further elaborated upon herein.

Mode control 52 provides controller 48 with information relating to the selected position of movable shade 22, i.e. whether the shade is to be in high beam position "C" or low beam position "D" of FIG. 2A, or the DRL position "E" of FIG. 2B. In practice, mode control 52 may be incorporated as an element of a system that controls various operational aspects of the vehicle's headlamps. For example, mode control 52 commands may be generated variously by one or more of a driver's control, ambient lighting sensors and automatic headlamp dimming controls (not shown).

With reference now to FIGS. 1-4 in combination, in operation of headlamp 10 the lamp 18 is powered at a predetermined optimum power level such that it emits substantially the same amount of light for low beam, high beam and DRL modes of the headlamp. If high beam operation of headlamp 10 is desired, mode control 52 provides a command signal to controller 48 representing high beam mode. In response, controller 48 uses information from feedback element 50 to determine whether movable shade 22 is in the predetermined position "C" for high beam operation. If movable shade 22 is in the prescribed position for high beam operation, controller 48 takes no further action. However, if movable shade is not in the prescribed position for high beam operation, controller 48 actuates motor driver 46, which in turn supplies power to operate motor 40. Motor 40 provides rotary motive power to drive member 38, which in turn acts to generally linearly move movable shade 22 in the direction required to achieve the commanded mode. As movable shade 22 moves, controller 48 periodically or continuously monitors the position of the movable shade using information from feedback element 50. When controller 48 determines that the predetermined position of movable shade 22 for high beam operation of headlamp 10 has been reached, the controller de-actuates motor driver 46, causing power to be removed from motor 40 and causing the movable shade to come to rest at the predetermined position of member 38, motor driver 46, controller 48, feedback element 50 and mode control 52 all function in a likewise manner to position movable shade 22 for low beam and DRL modes of operation of headlamp 10 at positions "D" and "E," respectively.

Figure 5:
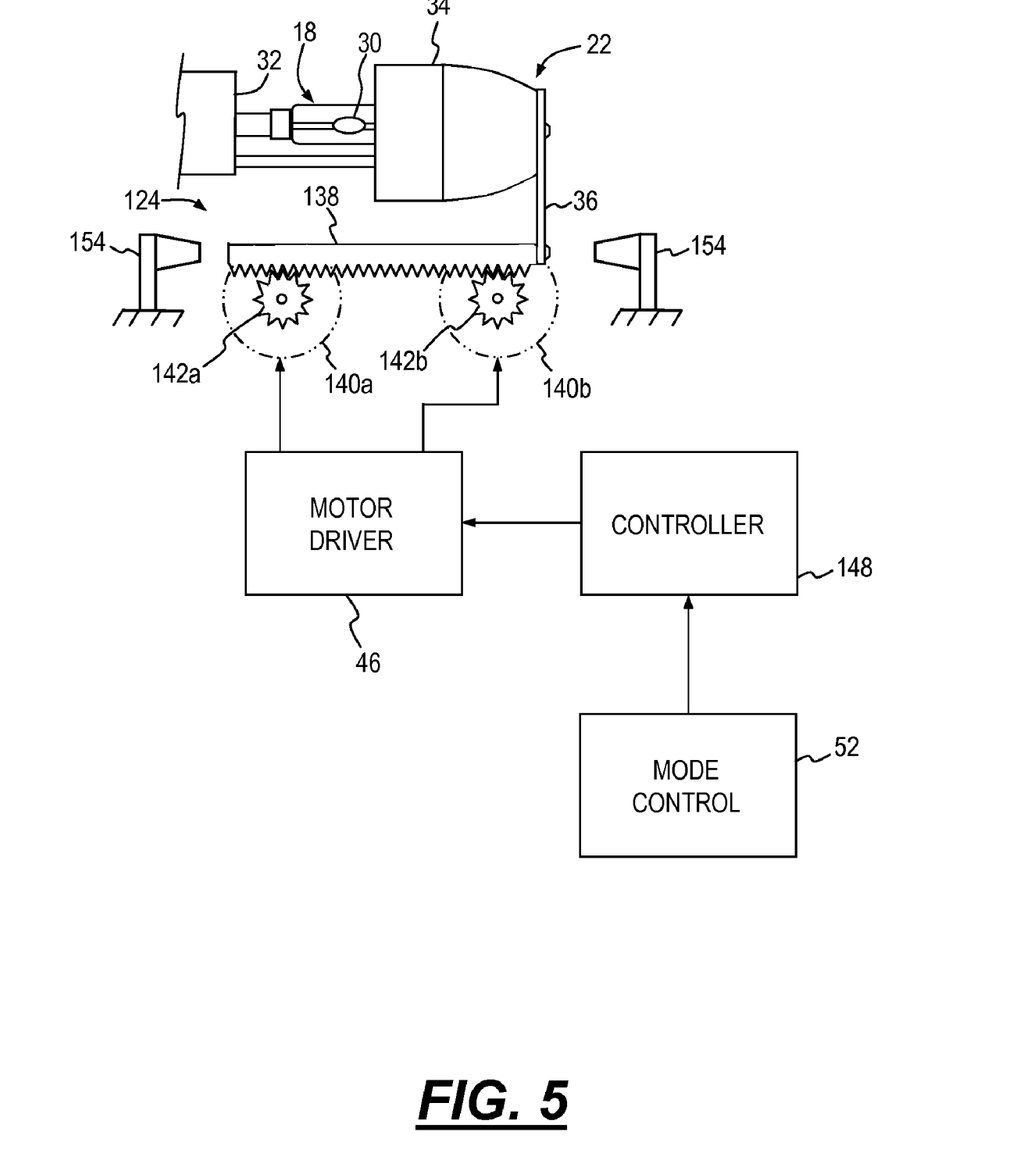
FIG. 5 is a block diagram showing the general arrangement of a system to control the position of a movable shade of a vehicle headlamp, according to an alternate embodiment of the present invention.

FIG. 5 depicts the general arrangement of a shade driver 124 comprising a drive member 138 and a pair of motors 140a, 140b (generally termed "motors 140") to control the position of a movable shade 22 of a vehicle headlamp according to an alternate embodiment of the present invention. Movable shade 22 is actuated by motor 140a and/or 140b, each motor being coupled to the shade by a common drive member 138. Each motor 140a, 140b may be configured to operate such that a corresponding output shaft 142a, 142b respectively (generally termed "output shafts 142"), rotates between two predetermined limit positions or stops 154 (FIG. 5).

In operation, one of motors 140 is actuated, causing its corresponding output shaft 142 to rotate clockwise or counter-clockwise to one of two limit positions, in turn causing drive member 138 to reposition shade 22 at a corresponding predetermined position, the displacement of the shade being determined by the angular rotation of the actuated motor's output shaft and the mechanical characteristics of drive member 138. The output shaft 142 of the unactuated motor rotates freely, allowing the output shaft to be driven by common drive member 138. A plurality of positions for shade 22 may be selected by mode control 52, depending upon such factors as actuation of only one of motors 140, actuation of one of motors 140 and then the other motor, the order of actuation of motors 140, and the predetermined angular displacement limits for each of output shafts 142a, 142b, among others.

Motors 140 may be any conventional type of motor including, but not limited to, a permanent magnet motor, a brushless DC motor, a linear actuator and a stepper motor. Motors 140 may optionally include a dynamic and/or mechanical brake to stop the motor and/or keep it from rotating when it is not actuated. Motors 140 may further include a gear reduction to provide an output shaft displacement, velocity and torque that is compatible with drive member 138 to move shade 22. For example, motors 140 may be DC gearmotors having integral limit switches (not shown) such that output shafts 142 move to a counter-clockwise position when a voltage having a first polarity is applied to the motor. Conversely, output shafts 142 may move to a clockwise limit position when a voltage having opposite polarity is applied to motors 140. In another example, motors 140 may be programmable stepper motors under directional and rotational control of a controller 148 wherein output shafts 142 rotate predetermined number of angular displacement steps with reference to an index or stop, providing for fixed limit positions in the clockwise and counter-clockwise directions of the output shafts.

Drive member 138 may be any conventional type of rotary-to-linear motion converter including, without limitation, a ball screw, lead screw, belt drive, and a rack-and-pinion. In some embodiments drive member 138 may be a rotary-to-oscillatory converter, such as a four-bar linkage mechanism. Drive member 138 may further comprise gearing to reduce the speed of rotational motive force provided by motors 140 and/or amplify the amount of motive force delivered by the motors. In other embodiments motors 140 and drive member 138 may be replaced by a linear motor-actuator.

In addition to having the previously-discussed aspects of controller 48, controller 148 may include position-tracking capability. The position-tracking capability of controller 148 can be configured to store data relating to an initial known calibration or index position of shade 22 and also store data relating to subsequent actuations of each of motors 140. This stored information can then be utilized by controller 148 to compute and track the current position of shade 22 to determine the required actuation of motors 140 to move shade 22 to a desired position in response to a command input received from mode control 52. Alternatively, controller 148 may receive position information from a feedback element 50 (see FIG. 4), as previously discussed, to move shade 22 to a desired position using one or both of motors 140.

Figure 6:
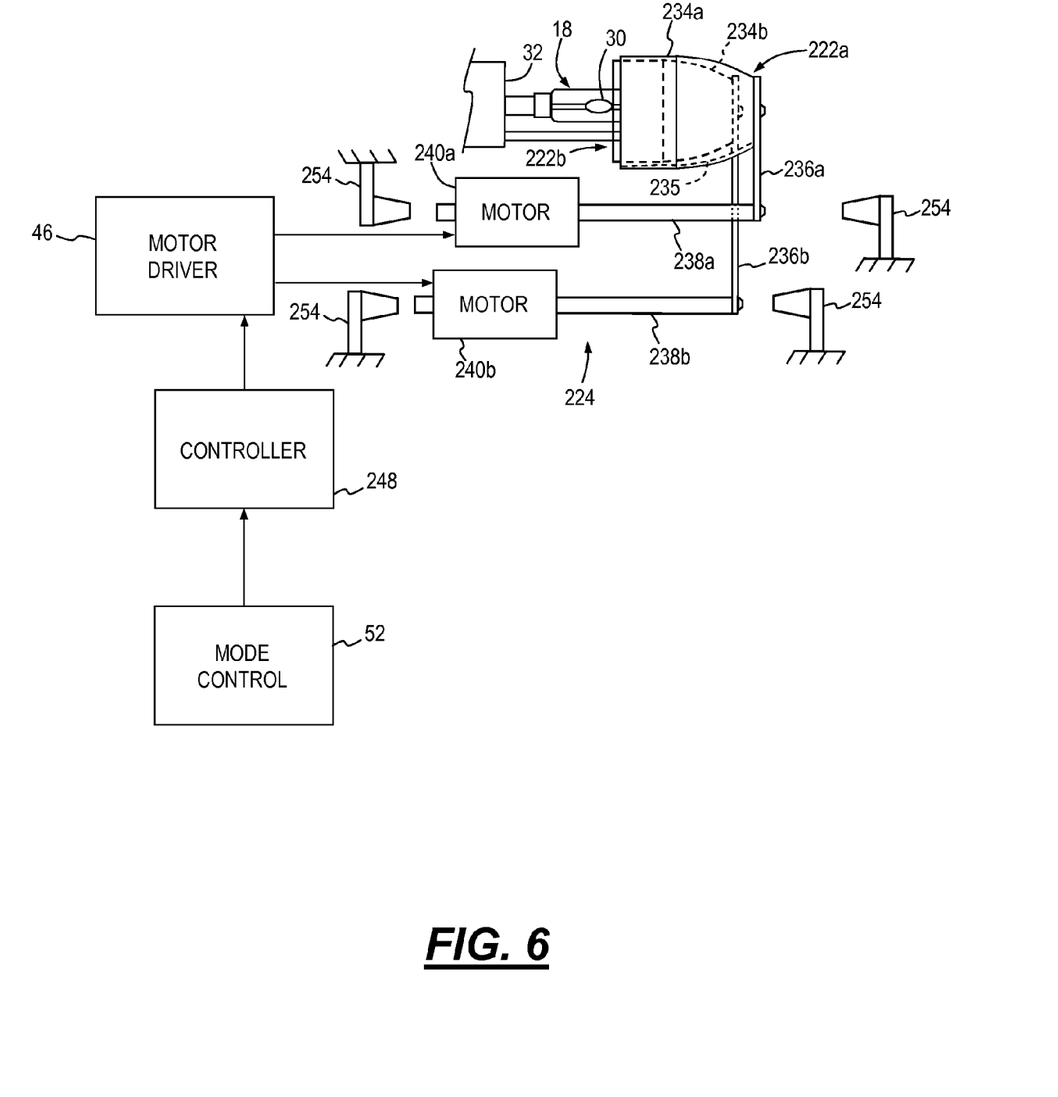
FIG. 6 is a block diagram depicting the general arrangement of a system to control the position of a movable shade of a vehicle headlamp, according to another alternate embodiment of the present invention.

FIG. 6 shows the general arrangement of a shade driver 224 comprising a pair of drive members 238a, 238b (generally termed "drive members 238") and a pair of motors 240a, 240b (generally termed "motors 240") to control the position of a plurality of movable shades of a vehicle headlamp, according to another alternate embodiment of the present invention. A first movable shade 222a is actuated by a motor 240a through an intermediate drive member 238a. A second movable shade 222b is likewise actuated by a motor 240b through an intermediate drive member 238b. A shade body 234b is configured to movably fit within a shade body 234a.

Motors 240 may be any type of motor suitable for use with headlight system 10, such as those discussed above for motors 40 and 140. Likewise, drive members 238 may be any type of drive mechanism suitable for use with headlight system 10, such as those discussed above for drive members 38, 138. Each motor 240 may optionally be configured to actuate a corresponding drive member 238 between two predetermined limit positions or stops 254 (FIG. 6) in the manner previously described for motors 140.

Shades 222a, 222b (generally termed "shades 222") may be configured similarly to shade 22, with shade body 234b being generally coaxial to fit within shade body 234a. Shade body 234b is also independently positionable with respect to shade body 234a. In one embodiment shade 222a may include a longitudinal slot 235 through which a shade leg 236b of drive member 238b extends, as shown in FIG. 6. Alternatively, an aperture 237 located at a closed end 239 of shade 222a can be provided to allow shade leg 236b and/or drive member 238b access to inner shade 222b, as shown generally in FIG. 7.

Figure 7:
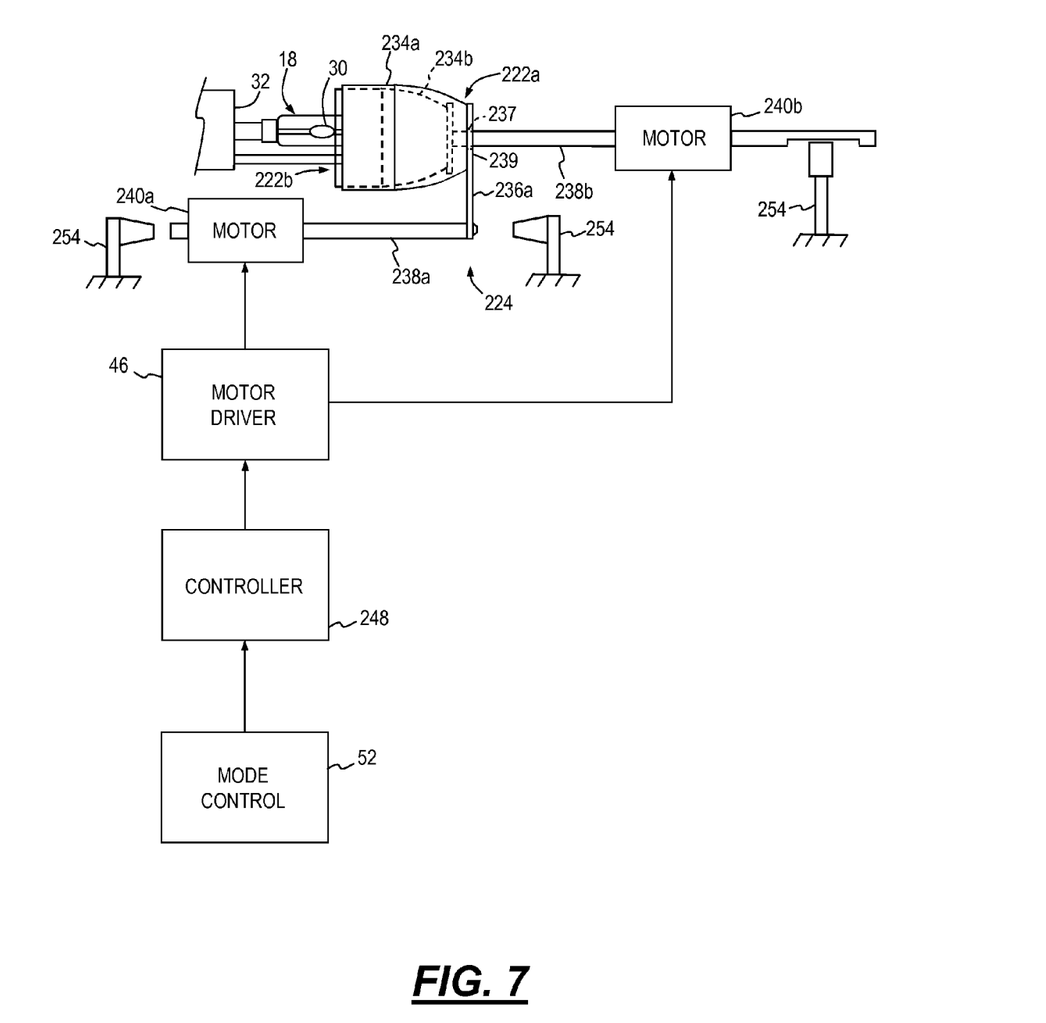
FIG. 7 is a block diagram showing an alternate arrangement of the system of FIG. 6, according to yet another alternate embodiment of the present invention.

With reference to FIGS. 6 and 7, controller 248 may include the features of either or both of controllers 48, 148 discussed above. The position-tracking capability of controller 248 can be configured to store data relating to an initial known calibration or index position of shades 222 and also store data relating to subsequent actuations of each of motors 240. This stored information can then be utilized by controller 248 to compute the required actuation of motors 240 to satisfy a command input received from mode control 52 to move either or both of shades 222 to a desired position. Alternatively, controller 248 may receive position information from a feedback element 50 as previously discussed (see FIG. 4), to move each of shades 222a, 222b to desired positions using corresponding drive members 238a, 238b and motors 240a, 240b.

In operation, motor 240a may be actuated independently of motor 240b, causing drive member 238a to move shade 222a to one of two predetermined limit positions, the displacement of the shade being determined by the angular rotation of the motor and the mechanical characteristics of drive member 238a. Motor 240b may likewise be actuated independently of motor 240b, causing drive member 238b to move shade 222b to one of two predetermined limit positions, the displacement of the shade being determined by the angular rotation of the motor and the mechanical characteristics of drive member 238b. In this embodiment a plurality of shading levels for lamp 18 may be selected by mode control 52, depending upon such factors as actuation of only one of motors 240, actuation of one of motors 240 and then the other motor, the order of actuation of motors 240, and the predetermined angular displacement of drive members 238, among others.

While this invention has been shown and described with respect to several detailed embodiments thereof, it will be understood by those skilled in the art that changes in form and detail thereof may be made without departing from the scope of the claims of the invention.

What is claimed is:

1. A vehicle headlamp, comprising:
   a light source;
   a reflector to direct light received from the light source out of the headlamp;
   a pair of generally concentric movable shades comprising an inner shade and an outer shade, the shades being independently positionable to control the light received by the reflector; and
   a shade driver to position the movable shades, the shade driver comprising:
      a first drive member coupled to a first motor and the inner shade, and
      a second drive member coupled to a second motor and the outer shade,
   wherein:
      a first position of the inner and outer shades configures the headlamp for high beam lighting,
      a second position of the inner and outer shades configures the headlamp for low beam lighting, and
      a third position of the inner and outer shades configures the headlamp for daytime running lights.

2. The vehicle headlamp of claim 1 wherein the outer shade further includes a slot through which a shade leg of the inner shade extends.

3. The vehicle headlight of claim 1 wherein the outer shade further includes an aperture disposed in a closed end through which at least one of a shade leg of the inner shade and the first drive member extends.

4. The vehicle headlamp of claim 1, further comprising at least one stop to position at least one movable shade.

5. The vehicle headlamp of claim 1 wherein the first and second drive members are one of a ball screw, lead screw, belt drive, rack-and-pinion and four-bar linkage mechanism.

6. The vehicle headlamp of claim 1, further comprising a controller having position-tracking capability, said controller being coupled to the shade driver through a motor driver.

* * * * *

UNITED STATES PATENT AND TRADEMARK OFFICE
CERTIFICATE OF CORRECTION

PATENT NO. : 7,290,907 B2  
APPLICATION NO. : 11/361555  
DATED : November 6, 2007  
INVENTOR(S) : Steven Kovach It is certified that error appears in the above-identified patent and that said Letters Patent is hereby corrected as shown below:

Column 4, line 58, replace "FIG. 2B." with -- FIG. 2B, --; lines 66-67, delete ""G(L)" thereof such that only a predetermined amount of light required to emit a low"

Column 5, lines 1-6, delete "beam is incident on the reflecting surface 28. Conversely, when at the high-beam forming position "C" of FIG. 2A movable shade 22 allows the light to be incident on substantially the entire region of reflecting surface 28 (i.e., both regions G(H) and G(L)) so as to ensure a sufficient amount of light to emit a high beam."

Column 6, line 59, replace "position of" with -- position. Motor 40, drive --.

Signed and Sealed this

Twenty-ninth Day of April, 2008

JON W. DUDAS  
*Director of the United States Patent and Trademark Office*